United States Patent [19]

Wolf

[11] Patent Number: 4,857,191

[45] Date of Patent: Aug. 15, 1989

[54] FILTER DEVICE

[76] Inventor: Joachim Wolf, Malmsheimer Str. 67, D-7252 Weil der Stadt, Fed. Rep. of Germany

[21] Appl. No.: 174,388

[22] Filed: Mar. 28, 1988

[30] Foreign Application Priority Data

Nov. 28, 1987 [DE] Fed. Rep. of Germany ....... 3740418

[51] Int. Cl.⁴ .............................................. B01D 35/30
[52] U.S. Cl. .................................. 210/286; 210/287; 210/443
[58] Field of Search ............... 210/286, 288, 443, 444, 210/287, 289

[56] References Cited

U.S. PATENT DOCUMENTS

| | | | |
|---|---|---|---|
| 74,215 | 2/1868 | Gonner et al. ...................... | 210/286 |
| 2,381,354 | 8/1945 | Larson ................................. | 210/286 |
| 3,950,251 | 4/1976 | Hiller ................................... | 210/443 |
| 4,711,717 | 12/1987 | Wolf ..................................... | 210/443 |

*Primary Examiner*—Ivars Cintins

[57] ABSTRACT

A filter apparatus is equipped with easily releasable coupling ends (28) of the inlet and outlet connection pieces (27) respectively, and the top wall (11) carrying the inlet and outlet connection pieces is connected unreleasably to the adjoining peripheral wall of the filter housing. For maintenance or cleaning, the filter apparatus is exchanged as a self-contained unit. Since the filter housing itself is not separable in operational terms and there are therefore no sensitive separable seals between housing parts, the housing cross-section can be of any form and therefore especially cuboid for the most effective possible utilization of space.

19 Claims, 3 Drawing Sheets

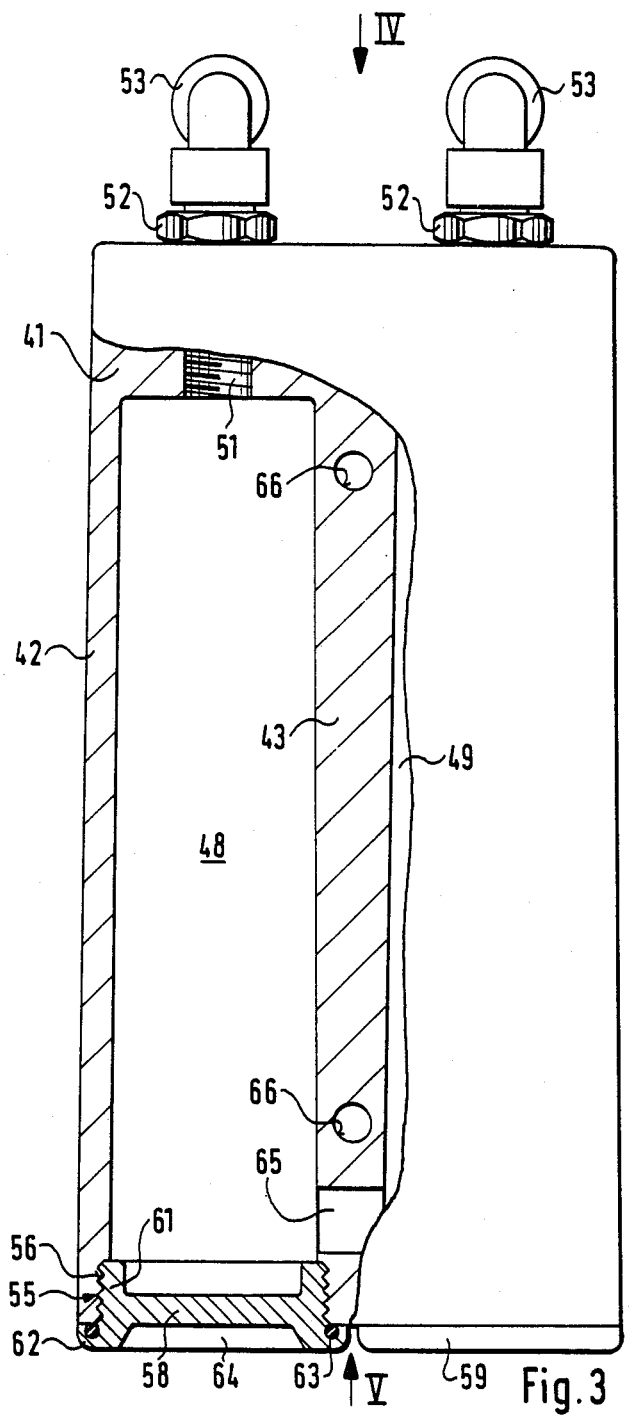

FILTER DEVICE

The invention relates to a filter apparatus for the filtering of liquids, in the filter volume range of 30 to 2000 cm3. Such filters have a filter housing having a top wall, a bottom wall, and an adjoining peripheral wall, with a first and a second perforation in the top wall.

An inlet connection piece is located in first perforation and an outlet connection piece is located in the second perforation, the inlet and outlet connection pieces being connectable to feed and discharge lines located on an appliance intended for the liquid to be filtered.

BACKGROUND OF THE INVENTION

German Offenlegungsschrift No. 3,520,139 describes, for example, a filter apparatus of this type. Basically, in these known filter apparatuses, the top wall is designed as a cover separable from the remaining housing part, specifically because, as a fixed component of the appliance, it remains connected unreleasably in operational terms to the feed and discharge lines. In order to clean the filter apparatus or exchange a filter cartridge, the cup-shaped housing part is unscrewed from the cover. For reasons of both reliable sealing and fastening, in practice, the cross-sections of the housing on filter apparatuses of the relevant generic order of size are exclusively circular. This has, above all, the following disadvantages:

(a) Opening the filter housing in or on the appliance during cleaning or the exchange of a filter cartridge often results in the escape of liquid;
(b) In order to open the filter housing, a large amount of free space must surround it, in order, on the one hand, to gain access with a tool and, on the other hand, to make it possible to draw the cup-like housing part off from the cover. The circular cross-section, in any case, represents an unfavorable utilization of existing installation spaces;
(c) It is not possible to produce multi-chamber filters because of the sealing problems which the separable housing presents;
(d) Reverse-flow cleaning of the filter is possible only by changing over the direction of flow of the liquid in the appliance.

OBJECT AND STATEMENT OF THE INVENTION

The object of the invention is to provide a filter apparatus of the relevant generic type, so that it can be accommmodated in a space-saving way and serviced easily.

This object is achieved by means of the following features:
(a) the top wall of the filter apparatus is resistant to bending, thicker than the adjoining peripheral wall and connected unreleasably thereto; and
(b) the inlet and outlet connection pieces are equipped with coupling ends for easily releasable pressure-tight connection to the appliance feed and discharge lines respectively.

The filter housing is now a fixed unit in operational terms and is taken out of the appliance and inserted into it complete for the purpose of maintenance, cleaning or exchange in each case. There is no sensitive separable seal between the housing parts, thus allowing complete freedom as to the form of the housing cross-section (and indeed of the shape of the housing in general). Thus, the housing can be matched as closely as possible to the conditions of space of a device, such as, for example, an automatic drink-vending machine. In particular, it can be cubic or cuboid, with the best possible utilization of space. The housing interior can also be divided and shaped with complete freedom. Thus, above all, the volume can be divided into two (or more) chambers of the same cross-sectional form, which are arranged in succession in the direction of flow and which are each of a length corresponding approximately to the height of the housing (as seen in the direction of flow). This ensures an ideal contact time of the liquid to be filtered with the filter material (for example, activated charcoal, resin). If provision is made in the system for reverse-flow cleaning, this can be brought about without an expensive installation, simply by inserting the filter apparatus rotated and with interchanged connection pieces.

Further advantageous features described in a preferred embodiment of the invention are as follows:

The coupling ends are designed as matching counterparts of halves of quick-action pipe couplings, the halves being firmly attachable to the feed and discharge lines respectively.

The coupling ends are arranged parallel to one another and directed perpendicularly away from the top wall.

The inlet and outlet connection pieces are designed as pipe-knee pieces, with the coupling ends aligned parallel to one another and parallel to and at a distance above the top wall.

According to these features the insertion and exchange of a filter apparatus can be carried out especially simply and quickly. In particular, this has a favorable effect even under confined conditions of space. Furthermore, if quick-action couplings with a built-in return-flow stop valve are provided, this prevents liquid at the appliance and/or at the filter apparatus from escaping when the latter is exchanged. This is especially advantageous where aggressive liquids are concerned.

The filter housing is prism-shaped, the top wall is rectangular, the bottom wall is rectangular, and between the top wall and bottom wall, the peripheral wall comprises four rectangular wall parts.

The top wall, bottom wall and adjoining peripheral wall have inner faces. The filter housing has an interior with a partition wall dividing the filter housing into two partial spaces. The partition wall has a top edge connected in a liquid-tight manner to the inner face of the top wall. The filter housing also has side edges connected in a liquid-tight manner to opposite inner faces of the peripheral wall and a lower edge adjacent the inner face of the bottom wall. A channel is provided between the two partial spaces in the region of the lower edge of the partition wall and relative to the inner face of the bottom wall via which the two partial spaces communicate, the first perforation opening into one of the two partial spaces, and the second perforation opening into the other of the two partial spaces.

The top wall has a plane and the perforations are bores, each having an internal thread, which are aligned perpendicularly relative to the plane of the top wall. The inlet and outlet connection pieces have matching external threads at one end arranged to be screwed into the perforations.

The filter apparatus can be designed as a disposable filter or as a regenerable filter. In the latter case, for example, the filter can be rinsed out in a regeneration appliance, without the housing being opened for this purpose. However, it may also happen that non-regenerable filter materials are intended to be exchanged, and the following design is particularly expedient for this. The bottom wall has at least one bore which has at least a diameter of 20 mm and an internal thread, and a screw-in closing plug cooperates with the internal thread of the bore for closing the bore. By means of this appropriately large bore, it is possible, for example, to extract used activated charcoal and introduce fresh activated charcoal.

Favorable flow conditions for a good filter effect are obtained in accordance with the following size ratios and dimensions:

The filter housing is designed as a quadrilateral prism, the ratio of the width of the top wall to its length and to the height of the filter housing being approximately 1:1.7:3.4.

The filter housing is designed as a quadrilateral prism, the ratio of the width of the top wall to its length and to the height of the filter housing being approximately 1:2:3.75.

The width of the top wall is between 40 and 45 mm.

The ratio of the distance between the first and said second perforations to the length of the top wall is approximately 1:2.

The top wall is rectangular and has a longitudinal edge and a geometrical center line parallel thereto and an axis of symmetry extending perpendicularly to the center line. The first and the second perforations are arranged on the geometrical center line and symmetrically relative to the axis of symmetry. This symmetrical design is recommended, above all, when the arrangement of the filter material on the inside is also symmetrical, so that it does not matter in which direction the liquid flows through. There is then no need to pay special attention to the allocation of the connections when the filter apparatus is inserted into an appliance. Thus, a filter apparatus can consequently also be inserted blind at locations where access is difficult.

The filter housing is prism-shaped, the top wall and the bottom wall being oval. This oval housing cross-section is a cross between the cylindrical form, withstanding the prescribed internal pressure with the smallest possible wall thicknesses, and the cuboid form utilizing the available space in the best possible way.

The top wall has two parallel and opposite straight outer longitudinal edges with ends connected by means of a semicircular edge.

The length of the straight outer longitudinal edges is a few millimeters greater than the diameter of the semicircular edges.

The diameter of the semicircular edges is approximately 47 mm, the length of the straight outer longitudinal edges is approximately 52 mm, and the height of the filter housing is approximately 200 mm.

At least one fastening bore is provided in the region of the partition wall, which crosses the filter housing and which does not communicate with the two partial spaces.

The first and second perforations are arranged coaxially relative to respective ones of the semicircular edges.

DESCRIPTION OF THE DRAWINGS

Further advantages of the invention emerge from the following description of preferred embodiments illustrated in the drawing.

FIG. 3 shows a side view, partially in section, of a second embodiment of the invention.

DESCRIPTION OF PREFERRED EMBODIMENTS

Figure 1:
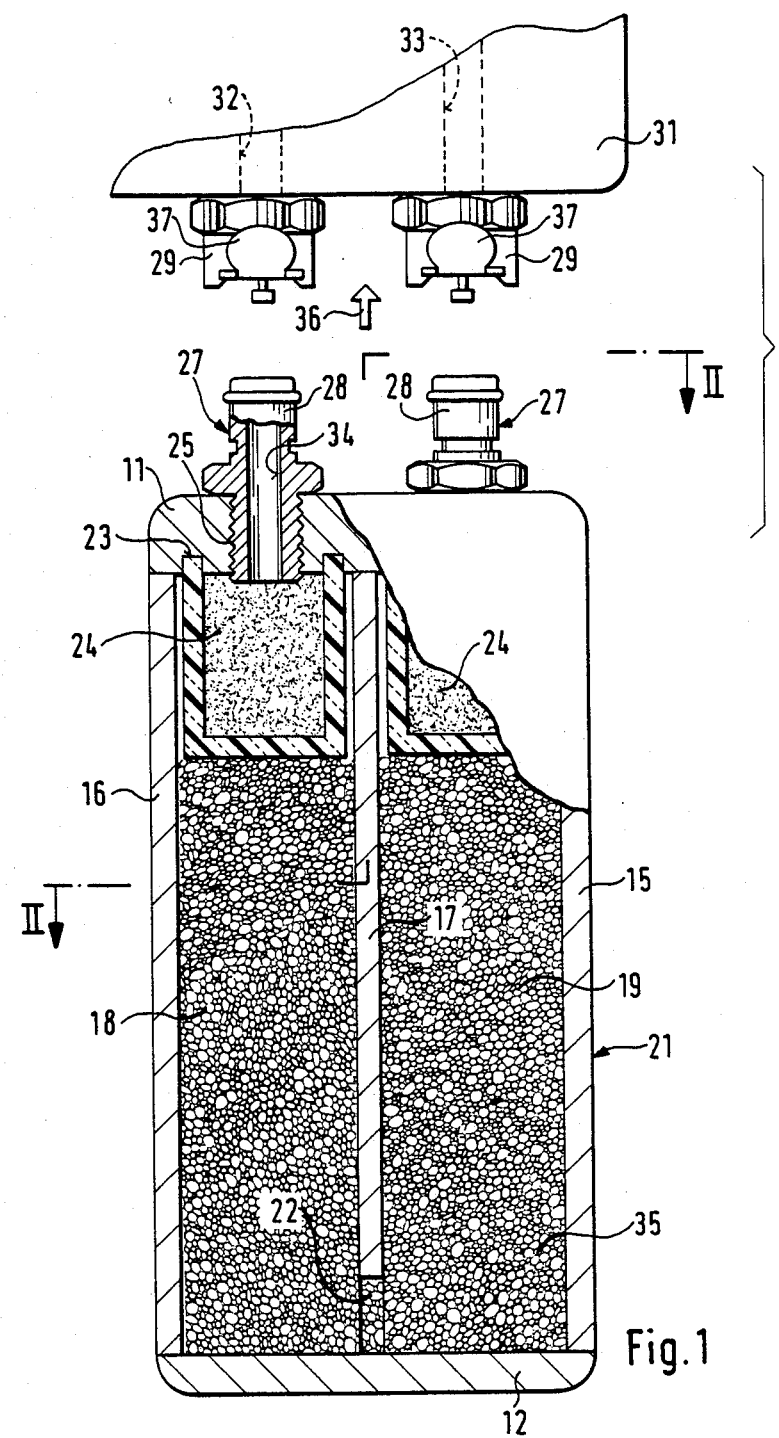
FIG. 1 shows a side view, partially in section, of a first embodiment of the invention.
Figure 2:
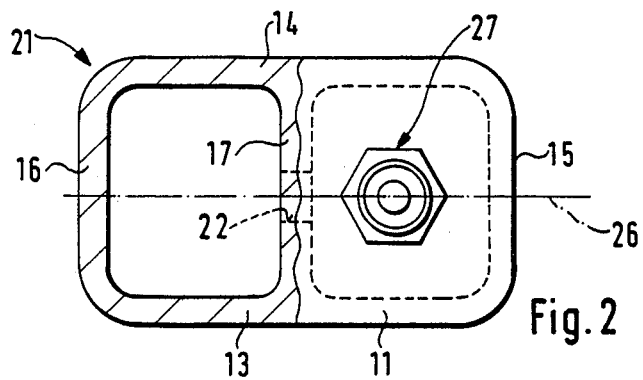
FIG. 2 shows a sectional view in the plane 2—2 of FIG. 1.

According to FIGS. 1 and 2, the filter housing is made prism-shaped, with a rectangular top wall 11, a rectangular bottom wall 12, two rectangular longitudinal walls 13, 14 and two rectangular transverse walls 15, 16. The top wall 11 is the main supporting wall and is therefore made especially sturdy. It is resistant to bending and thicker than the adjoining walls 13 to 16 which together form a peripheral wall. The interior is divided into two identical part spaces 18 and 19 by means of an essentially rectangular partition wall 17 which adjoins the top wall 11 and the longitudinal wall 13, 14 in a liquid-tight manner. The peripheral wall and the partition wall 17 are preferably a one-piece portion of an extruded section 21 which is approximately in the form of a FIG. 8 in cross-section (see FIG. 2) and to which the top wall 11 and the bottom wall 12 are welded at the top and bottom.

Before the extruded section 21 is closed, a portion is removed at the bottom in the middle of the partition wall 17, so that, in the final state, a channel 22 connecting the two part spaces 18 and 19 remains free.

On the inner face of the top wall 11 there are two circular grooves 23, of which that shown on the left in FIG. 1 is allocated to the part space 18 and the other (not visible in FIG. 1) is allocated in the same way to the part space 19. The edge of a cup-shaped porous filter insert 24 is anchored in each of these grooves 23.

In the top wall 11 there are two bores 25 provided, with an internal thread, which are aligned perpendicularly relative to its plane and of which only the one on the left can be seen in the sectional view of FIG. 1. The right-hand part is made symmetrical to this. The two bores are arranged on a geometrical center line 26 (FIG. 2) and symmetrically relative to an axis of symmetry extending perpendicularly to this. In the example, the internal thread is one of approximately 12 mm. Since the top wall 11 is likewise approximately 12 mm thick, there is consequently stable anchoring for inlet and outlet connection pieces 27 equipped with a matching external thread. In the example, these are equipped with coupling ends 28 which are designed as counterparts to quick-action pipe couplings 29 of a known type.

The axial bores 34 of the two inlet and outlet connection pieces 27 open out respectively inside the filter inserts 24. In order to complete the filter apparatus, the preassembled top wall 11 (with inlet and outlet connection pieces 27 and filter inserts 24) is therefore welded to the extruded section 21. Activated charcoal 35 is then introduced into the two part spaces 18 and 19 from the open underside, and the bottom wall 12 is then welded sealingly to the extruded section 21.

An accoutrement block 31 located on the appliance is indicated merely diagrammatically, and to it are anchored the two quick-action pipe couplings 29 to which a feed line 32 and a discharge line 33 lead respectively. When a finished filter apparatus is pushed against the accoutrement block in the direction of the arrow 36, the connection is therefore made extremely simply and quickly.

When the activated charcoal 35 is used up, the catches 37 are pressed and at the same time the filter apparatus is pulled back counter to the direction of the arrow 36. A new filter apparatus is inserted just as quickly.

The filter apparatus of FIG. 1 is intended especially for automatic drink-vending machines, in order to clean the mains water and particularly bind substances contained in it (such as, for example, chlorine) which would impair the flavor of the drink. This filtered water is then mixed with a special drink concentrate or, for example, coffee powder to form the desired drink. Since the activated charcoal is located in two part spaces 18 and 19 succeeding one another in flow terms, the water has a sufficiently long contact time with the activated charcoal to achieve a good filter effect. Conventional filter apparatuses, because of the space which they require, have always had to be installed separately from the automatic machine, this being impractical and ugly. Moreover, in addition to the standing space of the automatic machine, alternative access to the filter has had to be incorporated. However, the flat rectangular filter housing according to FIG. 1 can also be accommodated in the space provided for the automatic machines conventional hitherto. The exchange of a filter apparatus also takes up hardly any more room than the filter apparatus itself. Only in the direction of insertion (arrow 36) is it necessary to have a freedom of 15 mm corresponding to the length of the coupling ends.

The quick-action pipe couplings 28, 29 are commercially available under the brand name CPC—Quick Coupling of an American manufacturer.

In the upper part 29, they contain stop valves which open only when the respective coupling ends 28 are inserted and locked. During the exchange of the filter apparatus, therefore, no liquid can escape from the appliance. Couplings ends 28 with similar stop-valve inserts can also be provided, which then prevent liquid from escaping from the disassembled filter apparatus. This is expedient mainly where aggressive liquids are concerned.

Figure 4:
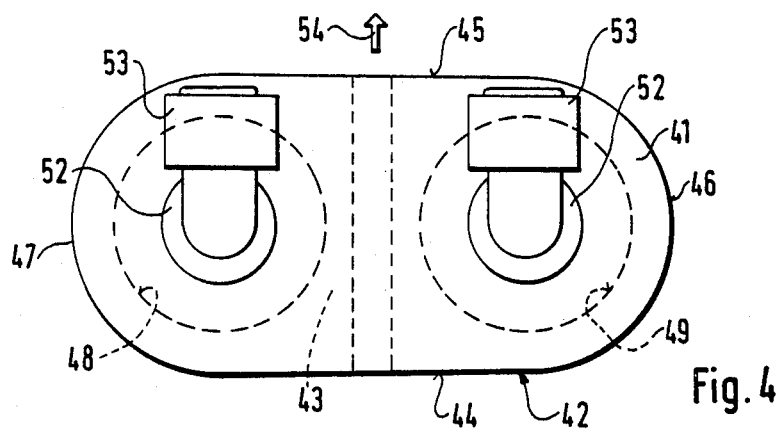
FIG. 4 shows an elevation in the direction of the arrow 4 of FIG. 3.
Figure 5:
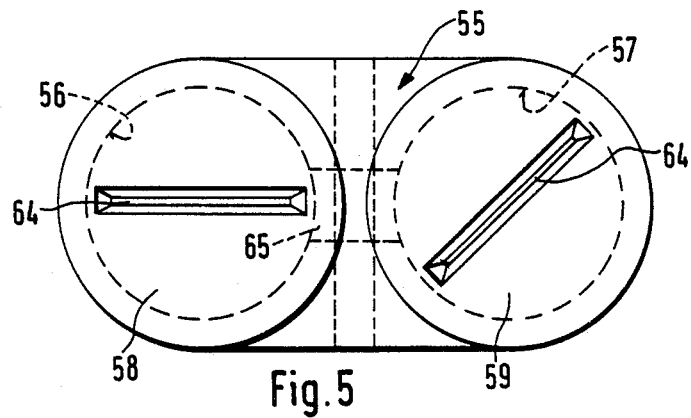
FIG. 5 shows an elevation in the direction of the arrow 5 of FIG. 3.

In the exemplary embodiment of FIGS. 3 to 5, the filter housing, together with the top wall 41, the oval peripheral wall 42 and the partition wall 43, comprises a onepiece injection-molded part made of polyethylene. In this prism-shaped housing, the top wall 41 has two parallel and opposite straight outer longitudinal edges 44, 45 which are connected at each end by means of a semicircular edge 46, 47. In the example, the length of the straight longitudinal edges 44, 45 is 52 mm, whilst the diameter of the edges 46, 47 is somewhat smaller, in particular 50 mm. The two part spaces 48, 49 on both sides of the partition wall 43 have the form of circular truncated cones, because the mold cores for these are somewhat narrower in the region of the top wall 41 than at the lower end, so that the injection molding can be drawn off from them easily.

Consequently, the part space has a clear width with a diameter of 36 mm at the top (in FIG. 3) and of 38 mm at the bottom. In a similar way to the previous example, in the top wall 41 are arranged symmetrically two bores 51 (of which only the left-hand one can be seen) which have an internal thread and into which corresponding inlet and outlet connection pieces 52 are screwed. In this example, these are knee-shaped inlet and outlet connection pieces, the coupling ends 53 of which point to the longitudinal edge 45 and are parallel to one another and parallel to and at a distance above the top wall 41. Thus, here, the filter apparatus is inserted into an appliance in the direction of the arrow 54 of FIG. 4, that is to say transversely relative to the longitudinal extension of the filter housing. The coupling ends 53 are part of quick-action pipe couplings (not shown particularly).

In the example of FIGS. 3 and 5, there is only a fragmentary bottom wall 55, in particular because the part spaces 48 and 49 move directly into bores 56, 57 of the same size with an internal thread. These bores 56, 57 are closed by means of closing plugs 58, 59 which thus form the main part of the bottom wall. These closing plugs 58, 59 are disks with an externally threaded portion 61 and with a sealing flange 62 which projects beyond the latter and into which is inserted a sealing ring 63. On each outer face there is an elongate depression 64, into which a tool (for example a coin) can be inserted in order to rotate the closing plug. Just above this "bottom wall" 55 there is a channel which is provided in the form of a bore 65 and which connects the part spaces 48, 49.

These releasable closing plugs are recommended when exchangeable filter inserts or filter granulate to be exchanged, etc. are inserted into the part spaces 48, 49. However, in a similar way to FIG. 1, it is also possible to weld on a closed bottom wall. Furthermore, such a bottom wall can have smaller bores with smaller closing plugs, but their diameter should be at least approximately 20 mm, for example in order not to impede the exchange of filter granulate too much.

It goes without saying, moreover, that, in a similar way to the previous example, the entire middle part together with the peripheral wall 42 and the partition wall 43 can also be made as a portion of an extruded section. A top wall is then welded on at the top, and at the bottom the circular part spaces opening out have cut in them an internal thread, into which the closing plugs 58, 59 are then screwed. Only the part spaces 48, 49 would then have to be circular-cylindrical according to the other production technique.

Although the cross-sectional form of the filter housing according to FIG. 4 does not utilize the installation space as efficiently as the cuboid form according to FIG. 1 (the edges shown rounded off there can also be left sharp), a part space with a circular cross-section does not bulge out even under a relatively high internal pressure. A filter apparatus of this type of construction can therefore withstand an internal pressure of more than $1 \cdot 10^6$ pascal (10 bar) without a change of shape.

The following dimensions (length × width × height) have proved practical for the size of the filter housings:
73 × 44 × 150 mm (FIGS. 1 and 2),
100 × 49 × 200 mm (FIGS. 3, 4 and 5) or
87 × 40 × 150 (not drawn).

In the example of FIG. 1, it was assumed that the part spaces 18, 19 are filled with activated charcoal. In this case, the two relatively large-surface filter inserts 24 made of porous plastic perform the function of filtering particles out of the liquid and of retaining coal-dust particles of the activated charcoal. The large surface area of the cup-shaped filter inserts 24 allows a more favorable flow distribution. It goes without saying that other filter media (for example resin) instead of activated charcoal or the known paper filter cartridges can also be used. In this case, the filter inserts 24 can also then be omitted.

In the exemplary embodiment of FIG. 3, there are two fastening bores 66 provided, which cross the filter housing in the region of the partition wall 43 and which do not communicate with the part spaces 48, 49. By means of fastening screws to be inserted correspondingly in these, the filter apparatus can be held in the appliance to an additional extent, thus relieving the inlet and outlet connection pieces 52. This is recommended especially when the appliance is exposed to vibrations, for example by the motor of a refrigeration unit or the like.

In the exemplary embodiments illustrated, the inlet and outlet connection pieces 52 are identical. It does not matter (with a symmetrical filling of the filter housing) which way round the filter housing is inserted into the appliance. If there is reverse-flow cleaning of the filter apparatus in specific cases of use, it is sufficient to insert the filter apparatus with interchanged connections. There is no need for a reversing valve in the appliance. However, if, for example, only one particular direction of flow is permitted in the case of an asymmetric filling of the filter housing, inlet and outlet connection pieces of different dimensions can be provided or it is possible to attach a key pin in an asymmetric position on the top wall, this having to fit into a suitable hole, for example in the accoutrement block 31 of FIG. 1.

As can be seen easily, an entire battery of, for example, the cuboid filter apparatuses according to FIG. 1 can be lined up directly above one another or next to one another for more complex filter systems.

The inlet and outlet connection pieces 52 of FIG. 3 for example, instead of being screwed into a threaded bore 51, can be inserted as early as during the injection-molding of the housing and thereby be anchored in the top wall 41. Finally, the catches 37 of FIG. 1 can be connected to a common plate in such a way that the two couplings are actuated jointly.

What is claimed is:

1. A filter apparatus for the filtering of liquids, said filter apparatus having a volume of from 30 to 2000 cm3, comprising:
   a filter housing having a top wall, a bottom wall, and an adjoining peripheral wall, with a first and a second perforation in said top wall,
   an inlet connection piece in said first perforation and an outlet connection piece in said second perforation, said inlet and outlet connection pieces being connectable to feed and discharge lines located on an appliance intended for the liquid to be filtered,
   filtering material in said filter housing,
   and the improvement wherein:
   (a) said top wall is resistant to bending, thicker than said adjoining peripheral wall and connected unreleasably thereto; and
   (b) said inlet and outlet connection pieces are equipped with coupling ends for easily releasable pressure-tight connection to the appliance feed and discharge lines respectively.

2. A filter apparatus as claimed in claim 1, wherein said coupling ends are matching counterparts of halves of quick-action pipe couplings, the halves being firmly attachable to the feed and discharge lines respectively.

3. A filter apparatus as claimed in claim 1, wherein said coupling ends are arranged parallel to one another and directed perpendicularly away from said top wall.

4. A filter apparatus as claimed in claim 1, wherein said inlet and outlet connection pieces are bent pipe pieces, with said coupling ends aligned parallel to one another and parallel to and at a distance above said top wall.

5. A filter apparatus as claimed in claim 1, wherein said filter housing is prism-shaped, said top wall is rectangular, said bottom wall is rectangular, and between said top wall and bottom wall, said peripheral wall comprises four rectangular wall parts.

6. A filter apparatus as claimed in claim 1, wherein said top wall, bottom wall and adjoining peripheral wall have inner faces, said filter housing has an interior with a partition wall dividing said filter housing into two partial spaces, said partition wall having a top edge connected in a liquid-tight manner to said inner face of said top wall, side edges connected in a liquid-tight manner to opposite inner faces of said peripheral wall and a lower edge adjacent said inner face of said bottom wall, and a channel is provided between said two partial spaces in the region of said lower edge of said partition wall and relative to said inner face of said bottom wall via which said two partial spaces communicate, said first perforation opening into one of said two partial spaces, and said second perforation opening into the other of said two partial spaces.

7. A filter apparatus as claimed in claim 6, wherein, at least one fastening bore is provided in the region of said partition wall which crosses said filter housing and which does not communicate with said two partial spaces.

8. A filter apparatus as claimed in claim 1, wherein said top wall has a plane and said perforations are bores, each having an internal thread, which are aligned perpendicularly relative to said plane of said top wall and said inlet and outlet connection pieces have matching external threads at one end arranged to be screwed into said perforations.

9. A filter apparatus as claimed in claim 1, wherein said bottom wall has at least one bore which has at least a diameter of 20 mm and an internal thread, and a screw-in closing plug cooperates with said internal thread of said bore for closing said bore.

10. A filter apparatus as claimed in claim 1, wherein said filter housing is a quadrilateral prism, the ratio of the width of said top wall to its length and to the height of said filter housing being approximately 1:1.7:3.4.

11. A filter apparatus as claimed in claim 10, wherein the width of said top wall is between 40 and 45 mm.

12. A filter apparatus as claimed in claim 1, wherein said filter housing is a quadrilateral prism, the relation of the width of said top wall to its length and to the height of said filter housing being approximately 1:2:3.75.

13. A filter apparatus as claimed in claim 1, wherein said top wall is rectangular and has a longitudinal edge and a geometrical center line parallel thereto and an axis of symmetry extending perpendicularly to said center line, and said first and said second perforations are arranged on said geometrical center line and symmetrically relative to said axis of symmetry.

14. A filter apparatus as claimed in claim 13, wherein the ratio of the distance between said first and said second perforations to the length of said top wall is approximately 1:2.

15. A filter apparatus as claimed in claim 1, wherein said filter housing is prism-shaped, said top wall and said bottom wall being oval.

16. A filter apparatus as claimed in claim 15, wherein said top wall has two parallel and opposite straight outer longitudinal edges with ends connected by means of two semicircular edges.

17. A filter apparatus as claimed in claim 16, wherein the length of said straight outer longitudinal edges is in the order of several millimeters greater than the diameter of said semicircular edges.

18. A filter apparatus as claimed in claim 17, wherein the diameter of said semicircular edges is approximately 47 mm, the length of said straight outer longitudinal edges is approximately 52 mm, and the height of said filter housing is approximately 200 mm.

19. A filter apparatus as claimed in claim 16, wherein said first perforation is arranged coaxially with one of said semicircular edges and said second perforation is arranged coaxially with the other of said semicircular edges.

* * * * *